(12) United States Patent
Siche et al.

(10) Patent No.: US 8,586,146 B2
(45) Date of Patent: Nov. 19, 2013

(54) MULTILAYER SURFACE COVERING WITH EXPANDED SUPPORTING LAYER

(75) Inventors: Alexandre Siche, Wiltz (LU); Jean-Yves Simon, Chiny (BE)

(73) Assignee: Tarkett G.D.L. S.A., Lentzweiler (LU)

( * ) Notice: Subject to any disclaimer, the term of this patent is extended or adjusted under 35 U.S.C. 154(b) by 19 days.

(21) Appl. No.: 13/375,701

(22) PCT Filed: Jun. 9, 2009

(86) PCT No.: PCT/EP2009/057109
§ 371 (c)(1),
(2), (4) Date: Jan. 24, 2012

(87) PCT Pub. No.: WO2010/142326
PCT Pub. Date: Dec. 16, 2010

(65) Prior Publication Data
US 2012/0128876 A1    May 24, 2012

(51) Int. Cl.
*B05D 1/36* (2006.01)
*B05D 5/00* (2006.01)
*B05D 3/00* (2006.01)

(52) U.S. Cl.
CPC *B05D 1/36* (2013.01); *B05D 3/007* (2013.01); *B05D 5/00* (2013.01)

USPC ............ 427/412.1; 427/243; 427/407.1

(58) Field of Classification Search
CPC ............. B05D 1/36; B05D 3/007; B05D 5/00
USPC ................... 427/243, 407.1, 412.1
See application file for complete search history.

(56) References Cited

U.S. PATENT DOCUMENTS 5,070,668 A * 12/1991 Lieberman .................. 52/309.9
2012/0114931 A1 * 5/2012 Siche ........................ 428/317.9

FOREIGN PATENT DOCUMENTS

| FR | 1 440 797 A | 6/1966 |
| GB | 1 384 791 A | 2/1973 |
| GB | 1 366 702 A | 9/1974 |

\* cited by examiner

*Primary Examiner* — William Phillip Fletcher, III
(74) *Attorney, Agent, or Firm* — Reinhart Boerner Van Dueren P.C.

(57) ABSTRACT

A method for manufacturing a multilayer surface coating including a PVC expanded surface layer is provided. The method includes the step of applying an aqueous composition including polyvinyl alcohol to the bottom portion of said supporting layer prior to the step of expanding said supporting layer.

11 Claims, 2 Drawing Sheets

MULTILAYER SURFACE COVERING WITH EXPANDED SUPPORTING LAYER

OBJECT OF THE INVENTION

The present invention relates to a method for manufacturing a PVC-based multilayer surface covering including a foamed support layer.

BACKGROUND OF RELATED ART

For interior or exterior decoration of a surface, such as a building, a home or a vehicle, decorative polyvinyl chloride (PVC) based surface coverings are well known and widely used.

In particular, multilayer PVC coverings are well known which include a foamed support layer and a wear layer.

Habitually, such multilayer surface coverings are produced by gelling a foamable support layer, onto which a wear layer and possibly a decorative layer is applied. During this step, the blowing agents present in the composition of the support layer are activated and cause the support layer to foam, thereby creating numerous pores within the PVC, which results in a PVC foam.

A multilayer surface covering which includes a foamed support layer has special acoustic properties, properties that so-called "compact", or non-foamed, surface coverings do not have.

It is generally accepted that the more the support layer is foamed, the better the acoustic properties of the surface covering. Thus, the acoustic performance characteristics of a foamed multilayer covering are habitually improved by increasing the thickness of the foam and by modifying the structure of the foam and particularly its density, i.e. by increasing its porosity. However, acoustic performance is generally improved at the expense of mechanical performance and conversely.

In addition, modification of the structure or the thickness of the PVC foam requires either the modification of the formulation of the composition of the support layer, or the modification of the operating conditions for the foaming of the support layer, and thus the operating conditions for the manufacture of the surface covering, or even both at the same time.

Thus, when one wants to produce coverings with different acoustic performance characteristics, the formulations and/or the operating conditions must be adapted to each specific covering produced, which requires numerous manipulations. Furthermore, these requirements are all the more important as the surface coverings are generally produced on a continuous production line. The production line must thus be stopped in order to make the necessary adjustments.

PURPOSES OF THE INVENTION

The present invention proposes a method for manufacturing a surface covering comprising a foamed support layer that does not present the drawbacks of the prior art.

The present invention proposes a method for manufacturing a surface covering with improved mechanical and acoustic performance characteristics.

SUMMARY OF THE INVENTION

The present invention describes a method for manufacturing a multilayer surface covering comprising a PVC-based expanded support layer, said method comprising a step of applying an aqueous composition comprising polyvinyl alcohol on the bottom portion of said support layer prior to the expansion of said supporting layer.

According to special embodiments, the method for manufacturing according to the invention includes one or more, or any combination of several of the following characteristics:
  the applying of the composition is done by printing,
  the applying of the composition is done over a width of 4 or 5 meters,
  the composition is applied to form, when dry, a layer 0.3 µm to 5 µm thick,
  the process further comprises a step wherein a primer is applied to the support layer prior to the application of the aqueous composition comprising polyvinyl alcohol, said primer being selected from a copolymer comprising acrylic acids, a polyurethane dispersion, a dispersion of polyisocyantes, a mixture of these compounds, or a mixture of PVC and acrylic resin dispersions.
  the composition further comprises a silanol or silane compound bearing at least one amine function
  the silane compound has the following formula

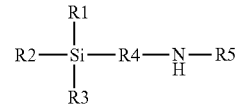

wherein $R_1$, $R_2$, $R_3$ are, independently from each other, either a hydroxyl group, methoxy group or an ethoxy group, wherein $R_4$ is a $(CH_2)_n$ group, n being equal to 1, 2 or 3, and wherein $R_5$ is, independently of $R_1$, $R_2$, $R_3$, a hydrogen, a linear or cyclic alkyl, a phenyl, an amide group, or an amino-ethyl group of the formula —$C_2H_4$—NH—$R_7$, $R_7$ being a hydrogen, an alkyl, a phenyl group, a benzyl group, or a vinyl-benzyl group,
  the silane compound represents between 6% and 40% by weight of the weight of the polyvinyl alcohol,
  the composition comprising polyvinyl alcohol is applied to the bottom portion of the support layer and the composition further comprising a silane compound comprising one amine function is applied to the top portion of said support layer,
  the method further comprising a step of applying a decorative film or decorative ink on the top portion of said support layer,
  the method further comprising a step of applying a polyurethane-based protective varnish on the wear layer.

DETAILED DESCRIPTION OF THE INVENTION

Figure 1:
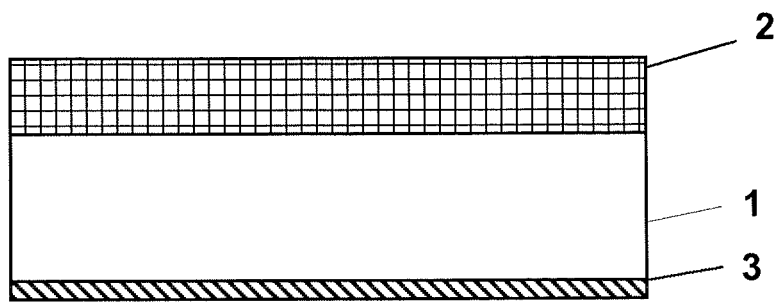
FIG. 1 schematically represents a multilayer surface covering comprising a foamed support layer covered by a barrier layer.
Figure 3:
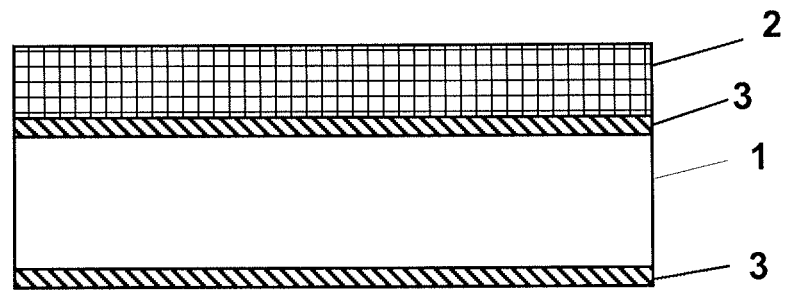
FIG. 3 schematically represents a third embodiment of a multilayer surface covering comprising a foamed support layer and a barrier layer.
Figure 4:
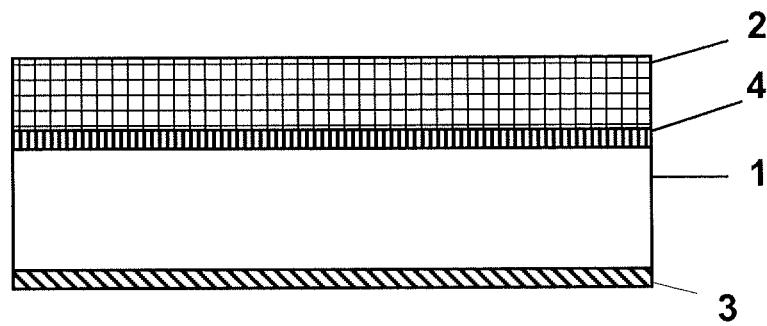
FIG. 4 schematically represents a multilayer surface covering comprising a foamed support layer, a barrier layer and a decorative layer.
Figure 5:
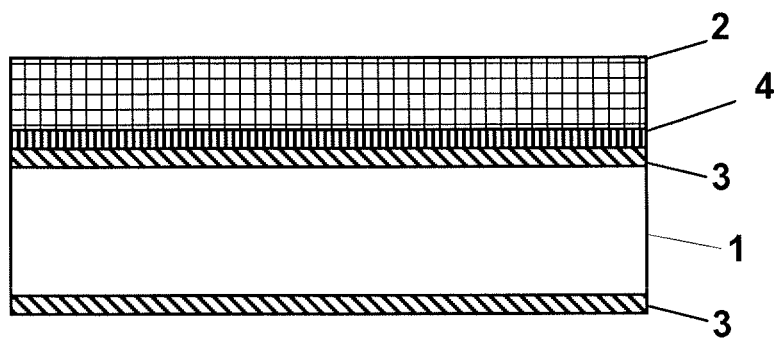
FIG. 5 schematically represents a second embodiment of a multilayer surface covering comprising a foamed support layer, a barrier layer and a decorative layer.

The method according to the invention for manufacturing a surface covering comprising a foamed support layer 1, whether it is a floor covering, wall covering or for the interior surfaces of a vehicle for example, involves a step wherein a polyvinyl alcohol (PVOH) composition is applied to at least the bottom portion of the support layer 1 (FIGS. 1 and 3).

Preferably, this step of coating the support layer takes place either before or after placement of the wear layer 2, possibly before or after placement of a decorative layer 4, nevertheless, and in any case, prior to expansion, or foaming, of the support layer 1.

Preferably, the polyvinyl alcohol (PVOH) composition coating step is integrated in a continuous surface covering manufacturing method, for 2 meter and 4 meter widths, and possibly even for greater widths.

The composition is applied on a PVC-based layer or film, for example by printing, rotogravure or a roller type coating device. The composition can be applied in a single-layer, or possibly in the form of several successive layers. Preferably, and once dry, the layer formed by the polyvinyl alcohol composition is 0.3 µm to 5 µm thick.

The polyvinyl alcohol composition is preferably an aqueous polyvinyl alcohol solution. Preferably, water represents between 80% and 96% by weight of the total weight of the composition.

The composition may also be a wetting agent, preferably a polyether-siloxane. Preferably, the wetting agent represents between 0.4% and 1.5% by weight of the total weight of the composition.

Examples of compositions are given in table 1. The proportion of the components is given in percentages by weight in relation to the weight of polyvinyl alcohol (pcr).

TABLE 1 examples of compositions.

|  | 1 | 2 | 3 | 4 |
|---|---|---|---|---|
| WATER | 2400.0 | 809.1 | 400.0 | 809.1 |
| PVOH | 100.0 | 100.0 | 100.0 | 100.0 |
| Wetting agent | 0 | 0 | 1.0 | 9.1 |

The polyvinyl alcohol is Elvanol® 90-50, Elvanol® 71-30, Elvanol® 70-75 by Dupont, or Exceval HR 3010, Exceval AQ 4104 by Kuraray.

The wetting agent is a polydimethylsiloxane polyether, for example BYK®-307 by BYK, or Tego® Wet 270 by Evonik.

As shown in tables 2 and 3, it surprisingly appeared that the application of the polyvinyl alcohol composition to the bottom portion (or "underside") (FIG. 1) of the supporting layer 1, which is a "foamable" layer prior to the supporting layer 1, allows better expansion of said supporting layer 1. Thus, by obtaining a lesser density, it is thus possible to use less material in the supporting layer 1 to obtain an identical foam thickness or alternatively a thicker covering for the same quantity of material.

TABLE 2

Compared characteristics of a surface covering obtained by a method of the background art and by the method according to the invention.

|  | Grained surface covering | Non-grained surface covering | Surface covering according to the invention | Non-grained surface covering, according to the invention |
|---|---|---|---|---|
| Total thickness (mm) | 3.23 | 3.22 | 3.69 | 3.65 |
| Grammage (g/m²) | 1776 | 1770 | 1806 | 1800 |
| Thickness of layers (mm) Wear layer | 0.09 | 0.09 | 0.09 | 0.11 |
| Support layer | 0.47 | 0.51 | 0.40 | 0.49 |
| Support layer with glassfiber mat | 0.40 | 0.39 | 0.41 | 0.46 |
| Foamable layer | 2.23 | 2.20 | 2.75 | 2.65 |
| Frank stiffness (mN) | 351 | 381 | 220 | 239 |
| Shrinkage 6 h 80° C. (%) |  |  |  |  |
| Lo | 0.04 | 0.03 | 0.05 | 0.06 |
| la | 0.04 | 0.03 | 0.10 | 0.10 |
| Curl 6 h 80° C. (mm) | 0.3 | 0 | 0.7 | 0.7 |
| Residual indentation (mm) | 0.27 | 0.24 | 0.22 | 0.28 |
| Flexibility CSTB | 1.95 | 2.05 | 2.51 | 2.47 |
| Accelerometry (dB) | 23 | 24 | 26 | 27 |

TABLE 3

Compared characteristics of a surface covering obtained by a method of the prior art and by the method according to the invention.

|  | Surface covering | Surface covering according to the invention |
|---|---|---|
| Total thickness (mm) | 2.62 | 2.67 |
| Grammage (g/m²) | 1550 | 1485 |
| Thickness of layers (mm) Wear layer | 0.10 | 0.13 |
| Support layer | 0.45 | 0.56 |
| Support layer with glassfiber mat | 0.27 | 0.34 |
| Expandable layer | 1.78 | 1.63 |
| Frank stiffness (mN) | 361 | 275 |
| Shrinkage 6 h 80° C. (%) |  |  |
| Lo | 0.04 | 0.06 |
| la | 0.08 | 0.07 |
| Curl 6 h 80° C. (mm) | 0.9 | 0.9 |
| Residual indentation (mm) | 0.12 | 0.03 |
| Flexibility CSTB | 1.69 | 1.67 |
| Accelerometry (dB) | 21 | 22 |

Furthermore, it is commonly accepted for surface coverings comprising a foamed support layer 1, that the improvement of the mechanical performance characteristics of said support layer 1, notably in terms of indentation, is generally achieved at the expense of acoustic performance. Nevertheless, it surprisingly appears that the application of the polyvinyl alcohol composition on the foamable support layer 1 improves the acoustic properties of the surface covering, not only by increasing the thickness of the foam generated, but also by the structural improvement of the foam thus obtained, while maintaining or improving the mechanical characteristics of the covering, notably in terms of puncture resistance.

An additional advantage is that, on a continuous surface covering manufacturing line, it is possible to modify the structure of the covering, and thus modulate its properties without having to change the formulation of the support layer 1, or change the operating conditions, although simply by covering, or not, the bottom portion of the support layer 1, namely the portion that will enter into contact with the surface covered, using the polyvinyl alcohol composition. It is also possible to modulate the properties of the surface covering by varying the application thickness of said composition. In doing so, efficiency is thereby enhanced in terms of production flexibility, as it is thus possible to continuously produce, on the same production line, surface coverings of different thicknesses and thus different acoustic and/or mechanical properties by controlling only the application of said composition.

The low adhesion of polyvinyl alcohol for a PVC-based layer or film, in particular for a PVC layer comprising inorganic fillers, does not pose appreciable problems. Furthermore, the expansion of the foamable support layer 1, which is realized in a conventional manner on a metal belt, and using blowing agents, is not disrupted by the fact that polyvinyl alcohol adheres weakly to the support layer 1. In addition, the adhesion of polyvinyl alcohol is nevertheless sufficient to allow the support layer 1 to pass unhindered through the production line implementing the method according to the invention.

Nevertheless, it may be beneficial to increase the adhesion of the polyvinyl alcohol on the PVC-based support layer 1, so that the polyvinyl alcohol becomes an integral part of the surface covering and forms a barrier layer 3 against the passage of contaminants present on the surface covered, for example contaminants from a bituminous surface, or from the adhesive used to bond the covering to the surface.

The adhesion of the polyvinyl alcohol for the PVC-based support layer 1 may be improved through the use of a primer, which is preferably a copolymer of acrylic acids, for example Neocryl® A 1131, or XK 151 by DSM), a polyurethane dispersion, for example Neorez R 989 by DSM), a polyisocyanate dispersion, for example Bayhydur® VP LS 2240), or combinations of these compounds. It is also possible to use a mixture of acrylic resin dispersions and PVC.

The adhesion of the polyvinyl alcohol for the PVC-based support layer 1 may also be improved through the use, in the polyvinyl alcohol-based composition, of a silane compound selected from among functionalized silanol or silane compounds, preferably silanol or silane compounds bearing at least one amine function.

Preferably, the silane compound has the following chemical formula:

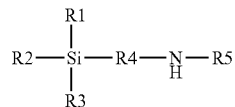

wherein $R_1$, $R_2$, $R_3$ are, independently from each other, either a hydroxyl group, a methoxy group, or a ethoxy group, and wherein $R_4$ is a $(CH_2)_n$ group, n being equal to 1, 2 or 3, and wherein $R_5$ is, independently of $R_1$, $R_2$, $R_3$, a hydrogen, a linear or cyclic alkyl, a phenyl, an amide group, or an aminoethyl group of the formula $-C_2H_4-NH-R_7$, $R_7$ being a hydrogen, an alkyl, a phenyl group, a benzyl group, or a vinyl-benzyl group.

The silane compound is selected from the group consisting of 3-aminopropyl-triethoxysilane, 3-aminopropyl-trimethoxysilane, aminoethyl-aminopropyl-silane triol, aminoethyl-aminopropyl-trimethoxysilane, N-(2-Aminoethyl)-3-aminopropyl-trimethoxysilane, N-(2-Aminoethyl)-3-aminopropyl-methyldimethoxysilane, N-2-(Benzylamino)-ethyl-3-aminopropyl-trimethoxysilane, N-2-(Vinylbenzylamino)-ethyl-3-aminopropyl-trimethoxysilane, N-Cyclohexyl-aminomethyl-methyldiethoxysilane, N-Cyclohexyl-aminomethyl-triethoxysilane, N-Cyclohexyl-3-aminopropyl-trimethoxysilane, N-Phenyl-aminomethyl-trimethoxysilane, and 3-Ureidopropyl-trimethoxysilane, Vinylbenzyl-aminoethyl-aminopropyl-trimethoxy silane.

Preferably, the functionalized silane compound represents between 6 and 40 pcr (percentage in relation to the polyvinyl alcohol). Advantageously, for a PVC-based expandable layer, the functionalized silane compound represents approximately 12.5 pcr.

Examples of compositions are given in tables 4 and 5. The proportion of the components is given in percentages by weight in relation to the weight of polyvinyl alcohol (pcr).

TABLE 4

Examples of polyvinyl alcohol-based composition including a functionalized silane compound.

|  | T | 5 | 6 | 7 | 8 | 9 |
|---|---|---|---|---|---|---|
| WATER | 809.1 | 809.1 | 809.1 | 809.1 | 809.1 | 809.1 |
| PVOH | 100.0 | 100.0 | 100.0 | 100.0 | 100.0 | 100.0 |
| Sil-1 | 0.0 | 6.0 | 12.5 | 20.0 | 30.0 | 40.0 |
| Wetting agent | 9.1 | 9.1 | 9.1 | 9.1 | 9.1 | 9.1 |

TABLE 5

Examples of polyvinyl alcohol-based composition including a functionalized silane compound

|  | 10 | 11 | 12 | 13 | 14 |
|---|---|---|---|---|---|
| WATER | 809.1 | 809.1 | 809.1 | 809.1 | 809.1 |
| PVOH | 100.0 | 100.0 | 100.0 | 100.0 | 100.0 |
| Sil-2 | 6.0 | 10.0 | 12.5 | 15.0 | 20.0 |
| Wetting agent | 9.1 | 9.1 | 9.1 | 9.1 | 9.1 |

The polyvinyl alcohol is Elvanol® 90-50, Elvanol® 71-30, Elvanol® 70-75 by Dupont, or Exceval HR 3010, Exceval AQ 4104 by Kuraray.

The wetting agent is a polydimethylsiloxane polyether, for example BYK®-307 by BYK, or Tego® Wet 270 by Evonik.

The silane sil-1 compound is 3-aminopropyl-triethoxysilane, for example Z-6011 by Dow Corning®. The silane sil-2 compound is aminoethyl-aminopropyl-trimethoxysilane, for example Geniosil® GF9 or GF91 by Wacker, or Z-6020 by Dow Corning®.

The composition comprising a silane compound is prepared with a mixture containing between 80% and 95% water by weight, between 5% and 20% polyvinyl alcohol by weight, and possibly between 0.4% and 1.5% wetting agent by weight. The mixture is first heated, for example between 90° C. and 95° C., prior to adding, while hot, for example at approximately 80° C., the silane compound which represents between 6% and 20% by weight (pcr) in relation to the quantity of polyvinyl alcohol. The composition is stirred for approximately 60 minutes at approximately 95° C.

The adhesion of the compositions including a functionalized silane compound on an expandable PVC layer is evaluated by applying compositions in the form of a single-coat which is dried, for example for one minute at 100° C., to form a film approximately 1 μm thick. The evaluation method consists of scratching the product with a six-tooth comb, then evaluating the peel resistance by means of TESA® 4124 type adhesive tape. The adhesion is considered to be good when no trace of film is torn away from the substrate. A "1" rating means that adhesion is good and a "3" rating means no adhesion. The results are presented in tables 6 and 7.

TABLE 6

Adhesion of the compositions of table 4 on a PVC-based foamable support layer.

|  | T | 5 | 6 | 7 | 8 | 9 |
|---|---|---|---|---|---|---|
| Expandable PVC supporting layer, including fillers | 3 | 1 | 1 | 1 | 1 | 1 |

TABLE 7

Adhesion of the compositions of table 5 on a PVC-based foamable support layer.

|  | T | 10 | 11 | 12 | 13 | 14 |
|---|---|---|---|---|---|---|
| Foamable PVC support layer, including fillers | 3 | 3 | 2 | 1 | 1 | 1 |

The barrier effect of the composition was evaluated by a tar test, which consists of placing liquid tar on the underside of the multilayer surface coating which comprises the barrier layer according to the invention, applied humid between 7 g/m² and 45 g/m². The tar is allowed to migrate for one week at a temperature of approximately 70° C. A rating between "1" and "5" is assigned based on the appearance of a stain on the topside of the floor covering. "1" means that there is no difference with a surface covering without tar, ratings "3" to "5" means that the surface covering has a color ranging from dark brown to black. The results are presented in table 8.

TABLE 8

Barrier effect.

|  | No barrier layer | T 22 g/m² | 14 7 g/m² | 14 15 g/m² | 14 22 g/m² | 14 35 g/m² | 14 45 g/m² |
|---|---|---|---|---|---|---|---|
| Foamable Support | 5 | 1 | 4 | 3 | 1 | 1 | 1 |

The PVC-based foamable support layer, which was used in the adhesion evaluation, includes 100 pcr PVC Pevikon® P682 and Pevikon® DP 2170, 117 pcr of calcium carbonate (Omya BL 20) used as an inorganic filler, 2.9 pcr of a blowing agent, an azodicarbonamide (Porofor ADCL-C2), 1.38 pcr of zinc oxide (ZnO) used to lower the decomposition temperature of the blowing agent, 0.7 pcr of Titanium RC 82, 30.3 pcr of DIHP (Jayflex 77), 26.2 pcr of DIBP (Palatinol® IC), and 14.5 pcr of a dearomatized hydrocarbon used as a viscosity reducer (Exxsol D100), "pcr" referring to the percentage in relation to the quantity of PVC.

The composition comprising a functionalized silane compound may, in a first embodiment, be applied to the bottom portion of the support layer 1, so as to improve expansion of the support layer 1 and form a barrier layer 3 (FIGS. 1, 3 to 5).

Figure 2:
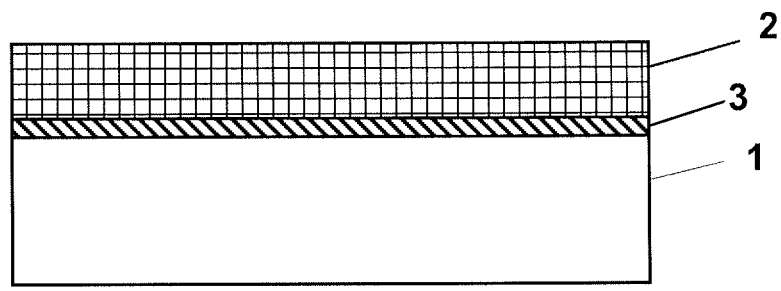
FIG. 2 schematically represents a second embodiment of a multilayer surface covering comprising a foamed support layer and a barrier layer.

However, in a second embodiment, the composition comprising a functionalized silane compound may also be applied to the top portion of the support layer 1, the portion on which the wear layer 2 will be applied (FIGS. 2, 3 and 5), and possibly a decorative layer 4 (FIGS. 4 and 5) may be applied, said decorative layer 4 being any appropriate layer, preferably, an ink or a film including one or more decorative designs. In this second embodiment, the composition forms a barrier layer 3 against the rise of contaminants present in the support layer 1, for example pigments from the recycled PVC that may have been used in the composition of the support layer 1. Preferably, the composition is applied to form a barrier layer at least 4 μm to 5 μm thick.

Preferably, the composition comprising a functionalized silane compound is applied humid to the support layer between 15 g/m² and 45 g/m², advantageously at approximately 22 g/m², or approximately 35 g/m².

Preferably, the manufacturing method according to the invention can also comprise a step wherein the wear layer 2 is covered with a decorative layer.

Preferably, the manufacturing method according to the invention can also comprise a step wherein the wear layer 2 is covered with a polyurethane-based protective varnish, for example.

KEY

1: Expanded supporting layer
2: Wear layer
3: Barrier layer
4: Decorative layer

The invention claimed is:

1. A method for manufacturing a multilayer surface covering comprising a PVC-based expanded support layer, said method comprising a step of applying an aqueous composition comprising polyvinyl alcohol on the bottom portion of said support layer (1) prior to the expansion of said supporting layer (1).

2. The method according to claim 1, wherein the applying of the composition is done by printing.

3. The method according to claim 1, wherein the applying of the composition is done over a width of 4 or 5 meters.

4. The method according to claim 1, wherein the composition is applied to form, after drying, a layer 0.3 μm to 5 μm thick.

5. The method according to claim 1, further comprising a step wherein a primer is applied to the support layer (1) prior to the application of the aqueous composition comprising polyvinyl alcohol, said primer being selected from a copolymer comprising acrylic acids, a polyurethane dispersion, a dispersion of polyisocyantes, a mixture of these compounds, or a mixture of PVC and acrylic resin dispersions.

6. The method according claim 1, wherein the composition further comprises a silanol or silane compound bearing at least one amine function.

7. The method according to claim 6, wherein the silane compound has the following formula:

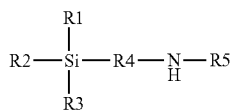

wherein $R_1$, $R_2$, $R_3$ are, independently from each other, either a hydroxyl group, a methoxy group, or a ethoxy group, and wherein $R_4$ is a $(CH_2)_n$ group, n being equal to 1, 2 or 3, and wherein $R_5$ is, independently of $R_1$, $R_2$, $R_3$, a hydrogen, a linear or cyclic alkyl, a phenyl, an amide group, or an amino-ethyl group of the formula —$C_2H_4$—NH—$R_7$, $R_7$ being a hydrogen, an alkyl, a phenyl group, a benzyl group, or a vinyl-benzyl group.

8. The method according to claim 6, wherein the silane compound represents between 6% and 40% by weight of the total weight of the polyvinyl alcohol.

9. The method according to claim 6, wherein the composition comprising polyvinyl alcohol is applied to the bottom portion of the support layer (1) and the composition further comprising a silane compound comprising one amine function is applied to the top portion of said support layer (1).

10. The method according to claim 1, further comprising a step of applying a decorative film or decorative ink on the top portion of said support layer (1).

11. The method according to claim 1, further comprising a step of applying a polyurethane-based protective varnish on the wear layer (2).

* * * * *